(12) United States Patent
Serralta et al.

(10) Patent No.: US 11,118,330 B2
(45) Date of Patent: *Sep. 14, 2021

(54) FLOOD MITIGATION AND PIPE FREEZE PREVENTION SYSTEMS FOR USE IN A STRUCTURE

(71) Applicants: Denset Serralta, Miami, FL (US); Rogerio Garcia, Pepperell, MA (US)

(72) Inventors: Denset Serralta, Miami, FL (US); Rogerio Garcia, Pepperell, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,932

(22) Filed: Jun. 24, 2019

(65) Prior Publication Data

US 2019/0382987 A1    Dec. 19, 2019

Related U.S. Application Data

(63) Continuation-in-part of application No. 15/700,142, filed on Sep. 10, 2017, now Pat. No. 10,329,745.

(60) Provisional application No. 62/393,415, filed on Sep. 12, 2016.

(51) Int. Cl.
| | |
|---|---|
| *E03B 7/07* | (2006.01) |
| *E03B 7/12* | (2006.01) |
| *E03B 7/08* | (2006.01) |
| *G01F 15/10* | (2006.01) |

(52) U.S. Cl.
CPC .............. *E03B 7/078* (2013.01); *E03B 7/071* (2013.01); *E03B 7/075* (2013.01); *E03B 7/08* (2013.01); *E03B 7/12* (2013.01); *G01F 15/10* (2013.01)

(58) Field of Classification Search
CPC . E03B 7/12; E03B 7/071; E03B 7/078; G01F 1/6884; G01F 15/022; G01F 15/10; G01M 3/04; G05D 7/00; Y10T 137/1353
See application file for complete search history.

(56) References Cited

U.S. PATENT DOCUMENTS

| | | | | |
|---|---|---|---|---|
| 4,800,371 A ‡ | 1/1989 | Arsi | ......................... | E03B 7/10 137/59 |
| 5,038,831 A ‡ | 8/1991 | Masson | ..................... | E03F 7/00 137/40 |
| 5,056,554 A ‡ | 10/1991 | White | ....................... | E03B 7/12 137/312 |
| 6,057,770 A ‡ | 5/2000 | Justesen | .................. | G01M 3/18 340/51 |

(Continued)

*Primary Examiner* — Kevin R Barss
(74) *Attorney, Agent, or Firm* — John L. DeAngelis; Wolter Van Dyke Davis, PLLC

(57) ABSTRACT

A system for controlling water delivery in to and out from a structure. Sensors in the structure determine a water leak from a water delivery system within the structure or an ambient temperature. A transmitter associated with each sensor transmits a signal to a controller, the signal indicating a water leak from the water delivery system or a temperature. Valves within the structure control the flow of water in to the structure, out from the structure, and within the structure. The controller receives the sensor signals and responsive thereto opens or closes one or more valves to stop water delivery into the structure, to drain water out from the structure, or to control water delivery within the structure. A source of pressurized gas activated by the controller applies pressure to water within the water delivery system and thereby assists with draining water from the structure.

20 Claims, 2 Drawing Sheets

(56) References Cited

U.S. PATENT DOCUMENTS

| | | | | |
|---|---|---|---|---|
| 6,675,826 B1 ‡ | 1/2004 | Newman | ............... | F16K 31/082 |
| | | | | 122/50 |
| 7,966,099 B2 ‡ | 6/2011 | Fima | ........................ | E03B 1/00 |
| | | | | 700/276 |
| 8,196,602 B2 ‡ | 6/2012 | Korzeniowski | ........... | E03B 7/12 |
| | | | | 137/56 |
| 8,402,984 B1 ‡ | 3/2013 | Ziegenbein | ............. | E03B 7/071 |
| | | | | 137/15.11 |
| 8,689,813 B2 ‡ | 4/2014 | Kim | ......................... | E03B 7/10 |
| | | | | 137/62 |
| 9,151,022 B2 * | 10/2015 | Patel | ....................... | F16K 31/12 |
| 9,683,350 B1 ‡ | 6/2017 | Mitzev | ..................... | E03B 7/12 |
| 9,719,234 B1 ‡ | 8/2017 | Christopher | .............. | E03B 7/12 |
| 2013/0025709 A1 ‡ | 1/2013 | Mann | ....................... | E03B 7/10 |
| | | | | 137/46 |

\* cited by examiner
‡ imported from a related application

FLOOD MITIGATION AND PIPE FREEZE PREVENTION SYSTEMS FOR USE IN A STRUCTURE

CROSS REFERENCE TO RELATED APPLICATIONS

This is a continuation-in-part patent application that claims the benefit of the U.S. patent application filed on Sep. 10, 2017, assigned application Ser. No. 15/700,142, entitled Flood Mitigation and Pipe Freeze Prevention Systems for use in a Structure, now U.S. Pat. No. 10,329,745, which claims the benefit under 35 U.S.C. 119(e) to the provisional patent application filed on Sep. 12, 2016, entitled Flood Mitigation and Pipe Freeze Prevention System, and assigned application No. 62/393,415. Both of these patent applications are incorporated herein in their entirety.

BACKGROUND OF THE INVENTION

Currently houses and commercial buildings throughout the United States, and especially in the North, are confronted with the high cost of damage caused by failures of the structure's water delivery system. This damage occurs according to two possible scenarios: (1) leakage of a sub-component of the water system (piping, valves, water heater, etc.) and (2) bursting of pipes due to freezing of the water carried by the system.

Damage due to leakage or freezing (referred to as an event) of any subcomponent of the water delivery system becomes especially grave if the house or building is unoccupied or unattended. Several such scenarios are identified in the list below, which is not exhaustive:
1. the event occurs when adults are at work
2. the event occurs when the family is in vacation
3. the event occurs overnight when occupants are asleep or the building is unattended or understaffed
4. the event occurs in a usually unattended room, for example in the basement These and other scenarios can result in heavy damages and cost to the owner and the insurance carrier.

Damage due to freezing of water within the system occurs in regions of the country where the temperature drops below freezing. This is due to the fact that water in solid form has a larger volume than water in a liquid state. Contrary to the usual behavior of most compounds, water expands rather than contracts, as it transforms from liquid to a solid state.

As in the case of water delivery system leakage, such an event may occur when the structure is unattended or when the occupants are unaware of the dangers associated with a frozen water delivery system.

BRIEF DESCRIPTION OF THE DRAWINGS

The forgoing and other features of the present inventions will be apparent to one skilled in the art to which the present inventions relate upon consideration of the following description of the invention with reference to the accompanying drawings, herein.

DESCRIPTION OF THE INVENTION

Before describing in detail the particular methods and apparatuses related to flood mitigation and pipe freeze mitigation systems of the present invention, it should be observed that the embodiments of the present invention reside primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the embodiments.

The presented embodiments are not intended to define limits as to the structures, elements or methods of the inventions, but only to provide exemplary constructions. The embodiments are permissive rather than mandatory and illustrative rather than exhaustive.

One embodiment of the present invention solves the problems identified above by including components to clear the water delivery system of all water in the case of freezing and to stop the inflow of water in the case of either a freezing or a leakage situation. The invention also provides for manual and electronic overrides available to the owner/occupant/user in a scenario where water flow is required and leakage or freezing is the lesser evil (as in the case of fire). One embodiment includes an automatic override feature, activated from within the structure, in a situation when it is inconvenient (e.g., during rain, snow) to operate a manual override outside the structure at the water intake or in conditions when it is dangerous to go outside (e.g., during a blizzard or hurricane). In another embodiment, the system comprises a manual override, at the intake, for use in a scenario in which the electronic system malfunctions or when power to the structure has been lost. Another embodiment includes failsafe operation so that the occurrence of certain events, such as a power loss, places the system in a safe state, unless manually overridden.

Figure 1:
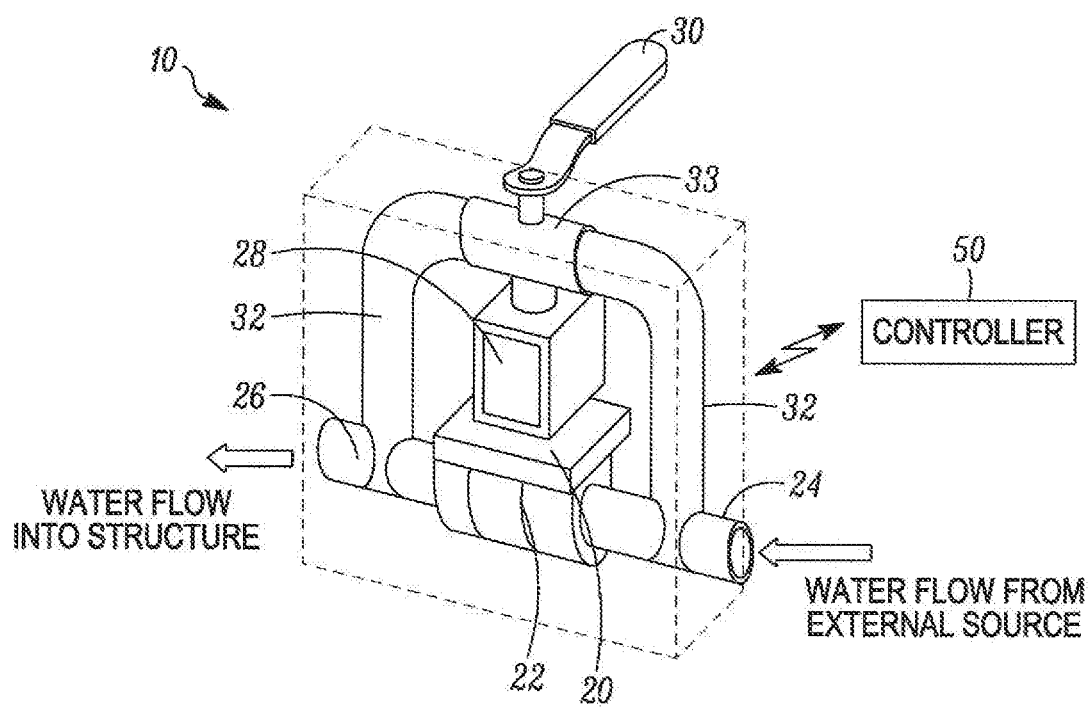
FIG. 1 is a front view of a flood mitigation system of the present invention.
Figure 2:
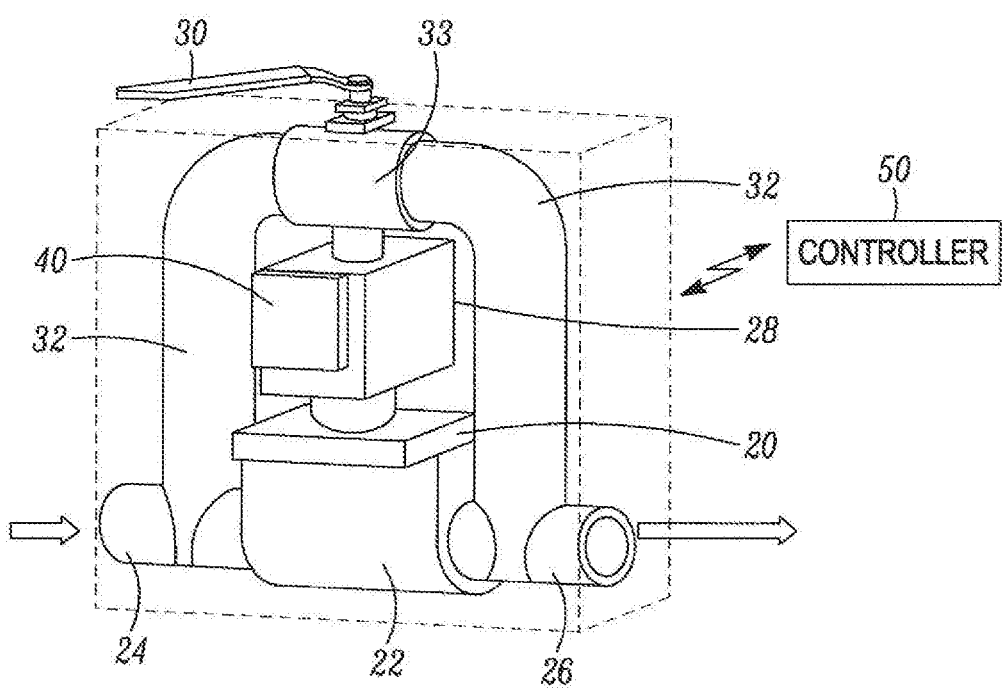
FIG. 2 is a rear view of the flood mitigation system of the present invention.

The figures and the description of roles and modes of operation set forth below explain operation of a flood mitigation system 10 of the present invention. Refer to FIGS. 1 and 2. The flood mitigation system (also referred to as a flood prevention system) is intended for use in any structure or building with water pipes.

Flood Mitigation System 10
Power Sensing Relay Switch 20
Automatically opens or closes a shutdown valve 22. For example, when power is lost the valve 22 closes to stop water flow into the structure. Water flow in FIG. 1 is in a direction from an intake port 24 from an eternal source of water supply, to an outflow port 26 into a structure.
Maintains the shutdown valve 22 in an open condition when powered.
Closes the shutdown valve 22 responsive to a close signal from a wireless receiver 28, as described further below. This action stops the flow of water into the structure from the external source.
The shutdown valve 22 can be bypassed by manual operation of a handle 30, in effect, opening a bypass path 32 and associated bypass valve 33 around the shutdown valve 22.
The relay switch 20 senses when power has been lost (or receives a signal from a controller 50 indicating power loss) and responsive thereto closes the shutdown valve 22. One embodiment includes a delay function before operating the relay switch 20, i.e., the switch 20 does not close the valve 22 until a predetermined number of seconds has elapsed from loss of power.

Sensors disposed at various locations within the structure in which the flood mitigation system 10 is installed, provide information to a controller 50 (described below) for controlling the system, e.g., opening or closing the shutdown valve 22, by sending an appropriate signal to the power sensing relay switch.

With reference to the rear view of FIG. 2, electrical contacts 40 are illustrated for supplying power to the wireless receiver 28 and the power sensing relay switch 20.

Wireless Receiver 28

Receives signal from the controller 50 (further comprising a receiver and transmitter) to open or close the relay switch 20, which in turn opens or closes the shutdown valve 22.

The controller 50 can be programmed with parameters that when satisfied signal the relay switch 20 to close (or open) the shutdown valve 22.

Sensor signals (described further below) are provided to the controller 50 (over a wired or wireless communications link) for controlling operation of the flood mitigation system 10.

The wireless receiver 28, as well as other elements of the system (including the receiving and transmitting components of the controller 50), can be based on protocols according Wi-Fi, Bluetooth, Zigbee or other communications standards known in the art.

Shutdown Valve 22

Controlled by the relay switch 20 to open or close the flow path between the intake port 24 and the outflow port 26.

In one embodiment, the shutdown valve 22 is typically a ball valve with a handle for manually overriding a closed condition of the valve 22.

Operating the handle opens the valve.

According to another embodiment, illustrated in FIG. 1, a manual override bypass valve 33, as described further herein, allows the user to override the condition of the shutdown valve 22.

A sensor (not shown) determines a state of shutdown valve 22 and notifies the controller 50 as to that state (opened or closed) and also when the valve 22 is in the override state.

Manual Override Bypass Valve 33

Is normally closed to water flow so that water flow is controlled by the condition of the shutdown valve 22.

When opened, the manual override bypass switch 33 overrides a closed condition of the shutdown valve 22, allowing water to flow through the bypass path 32 from the intake port 24 to the outflow port 26.

Intake Port 24

Water flows into the intake port 24.

Outflow Port 26

Water flows out of the system at the outflow port 26.

Bypass Piping 32

Water flows (or stops flowing) through the system, including the shutdown valve 22 based on an operator-controlled position of the manual override bypass valve 33.

Controller 50 (Including a Programmable Controller and Wireless Receiver and Transmitter)

Receives signals from all the sensors (see FIG. 6 for locations and function of various exemplary sensors).

The controller 50 makes decisions to open or close valve(s), distinguishing between the flood mitigation system 10 and a pipe freeze system 58 as described further below.

Controls all valves in the flood mitigation system 10.

Registers all system sensors.

Registers and identifies all sensors by their electronic ID's.

Registers all system valves

Registers the valve type (i.e., associated with the pipe freeze mitigation system 58 or the flood mitigation system 10)

Registers and identifies all valves according to their electronic ID's

Includes a human interface screen and keyboard for use by a user (or technician, installer, etc.) to program the system.

In addition to programming the system, the interface screen and keyboard are used to monitor a current system state. Exemplary displays include:

Displays: "Normal" state

Displays: "Triggered," including opened/closed valve (s) and the sensor(s) responsible for opening or closing the respective valve.

Displays the valve(s) that have been manually overridden.

Sensors (for Determining Water Presence and Water and/or Air Temperature)

Water presence sensor(s) detect water accumulation at its installed location. Generally, such sensors are installed in, for example, bathrooms, basements, under kitchen counters and in a commercial structure at any location where a water leak can be detrimental.

Temperature sensor(s) detects the water (or air) temperature at its installed location, in particular at locations where the pipe may begin to freeze.

Pipe Freeze Mitigation System 58

The pipe freeze mitigation system 58 is intended for use in any location where the ground and any underground pipes therein, can freeze. Typically, the depth of the water and sewer piping systems is dependent on the expected cold-weather temperatures in a region. For example, in Massachusetts the sewer pipes are set about one meter deep. In Maine or Vermont those pipes are placed at a depth of two meters. Within a structure, the sewer system is located at the lowest point in the structure, allowing water in the pipe to flow by gravity down to that lowest point.

The pipe freeze mitigation system is similar in certain aspects to the flood mitigation system 10 described above, with the following exceptions and variations.

The pipe freeze mitigation system 58 does not include a bypass flow path, such as the bypass flow path 32 of FIGS. 1 and 2.

The pipe freeze mitigation system includes a manual override bypass switch connected to an outflow port.

When the power is off, a power sensing relay switch opens, i.e. permits the flow of water out from the structure in which the pipe freeze mitigation system 58 is installed. With the power off, the structure is more likely to experience a freeze condition; by permitting the water to exit the structure frozen pipes are avoided.

Figure 3:
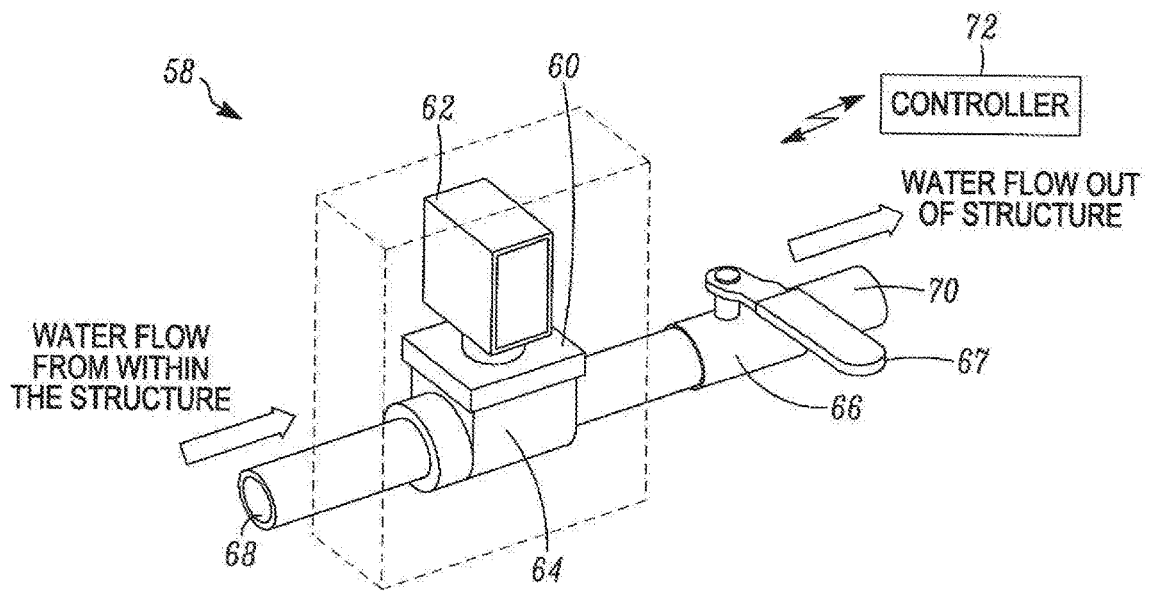
FIG. 3 is a front view of a pipe freeze mitigation system of the present invention.

FIG. 3 and the description of roles and modes of operation set forth below explain operation of the pipe freeze mitigation system 58 of the present invention.

Power Sensing Relay Switch 60

Automatically opens or closes pipe freeze prevention valve 64 as controlled by signals from a controller 72.

The power sensing relay switch 60 maintains the valve 64 in a closed condition when powered unless opened responsive to a signal from a wireless receiver 62.

The power sensing relay switch 60 opens the valve 64 when there is no power, permitting water to drain from the structure. This "no-power" condition can be determined by the power sensing relays switch 68 or a signal from the controller 72 can indicate a power condition (e.g., power or no power to the structure).

The power sensing relay switch 60 also opens the valve 64 in the event a freeze condition within the structure or within the structure's water delivery system is detected, as signaled from the controller 72.

Wireless Receiver 62

Receives signal from the programmable controller 72 (further comprising a receiver and transmitter) to open or close the power sensing relay switch 60, which in turn opens or closes the pipe freeze prevention valve 64.

These signals originate from the controller 72, that can be automatically or manually programmed with parameters, that when satisfied signal the power sensing relay switch 60 to close (or open) the valve 64. Sensor signals (described further below) are provided to the controller 72 for controlling operation of the system.

The wireless receiver 62, as well as other elements of the system (including the receiving and transmitting components of the controller 72) can be based on protocols according Wi-Fi, Bluetooth, Zigbee or other communications standards known in the art.

Electrical prongs (not shown) are located on a rear surface of the wireless receiver 62 for supplying power to the various components of the pipe freeze mitigation system 58.

Pipe Freeze Prevention Valve 64

Controlled by the power sensing relay switch 60.

When opened, water flows from an intake port 68 that carries water from within the structure to an outflow port 70 that carries the water out from the structure.

Manual Override Bypass Valve 66

Normally open to permit water flow from the intake port 68 to the outflow port 70 as controlled by the condition of the pipe freeze prevention valve 64.

The manual override bypass switch 66 closes water flow from the intake port 68 to the outflow port 70.

Typically, the override bypass switch 66 comprises a ball valve with a handle 67 to allow an override in the event of a system malfunction.

A sensor (not shown) associated with the manual override bypass valve 66 notifies the controller 72 that the valve 66 is in the override state.

Intake Port 68

Water flows into the intake port 68 from pipes within the structure.

Outflow Port 70

Water flows from the outflow port 70 out of the structure, to a sewer system, for example.

Controller 72

Receives signals from all the sensors (see FIG. 6 for location and function of various exemplary sensors).

Makes decisions to open or close valve(s) in the system, distinguishing between the flood mitigation and pipe freeze systems, based on system and valve conditions.

Controls all valves in the system.

Registers all system sensors.

Registers and identifies all sensors by their electronic ID's.

Registers the number of system valves

Registers the valve type (i.e., pipe freeze mitigation system 58 or the flood mitigation system 10)

Registers and identifies all valves according to their electronic ID's

Includes a human interface screen and a keyboard for use by a user (or technician, installer) to program the system:

In addition to programming the system, the interface screen and keyboard are used to monitor a current system state.

Displays: "Normal" state

Displays: "Triggered," including opened/closed valve(s) and the sensor(s) responsible for opening or closing the respective valve.

Displays the valve(s) that have been manually overridden.

Sensors (for Water Presence and Temperature)

Water sensor(s) detects water accumulation at its installed location. Generally, such sensors are installed in, for example, bathrooms, basements, under kitchen counters and in a commercial structure at any location where a water leak can be detrimental.

Temperature sensor(s) detects the water temperature at its installed location, in particular at locations where the pipe may begin to freeze.

Co-located components of the flood mitigation system 10 and the pipe freeze mitigation system 58 may be housed within an enclosure or casing for protection of the various components.

Flood Mitigation System Operation

Figure 4:
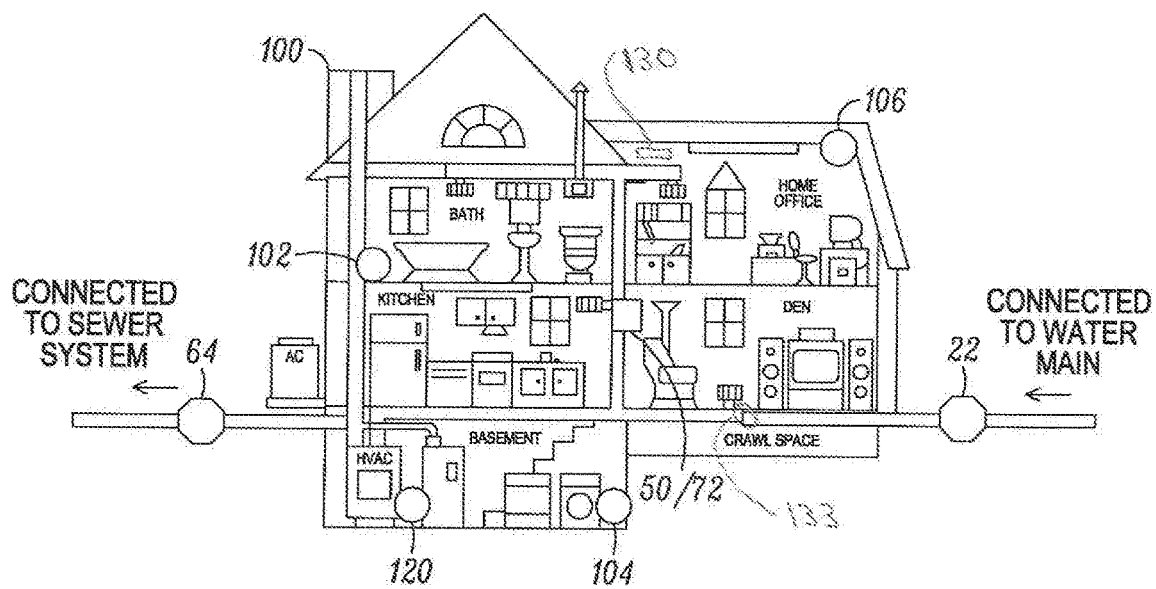
FIG. 4 illustrates a flood mitigation system and pipe freeze mitigation system installed in a house.

FIG. 4 illustrates an exemplary system configuration for a house 100. Although operation is described with reference to the house 100, the systems of the invention can be installed in any commercial or industrial building (e.g., school, hospital, restaurant, office, factory)

Wireless water presence sensors 102 and 104 detect accumulation of water on a bathroom floor (the sensor 102) and on a basement floor (the sensor 104) and wirelessly relay the condition to the controller 50.

Signal from either sensor 102 or 104 may be amplified by a wireless repeater/amplifier 106.

The controller 50 sends a wireless signal to the wireless receiver 28 for closing the shutdown valve 22 (see FIG. 1) to cut the flow of water into the structure. If the flood condition is localized to a specific area of the structure, the controller can send a message to the appropriate valves to stop water flow to the flooded area.

If previously programmed accordingly, the controller 50 sends a text message, email, or makes a robot-call to one or more programmed phone numbers, indicating that water accumulation was detected and the system has been triggered to shut water flow into the house 100.

Pipe Freeze Mitigation System Operation

A temperature sensor 120 emits a signal upon detecting a temperature value within a predetermined range of the freezing point of water.

The signal may be amplified by the wireless repeater/amplifier 106.

Upon receiving the signal from the temperature threshold sensor 120, the controller 72 sends a wireless signal to the wireless receiver 28 for closing the shutdown valve 22 to cut the flow of water into the house 100.

The controller 72 also sends wireless signal to the wireless receiver 62 to open the pipe freeze prevention valve 64 to drain water from pipes within the house 100.

If previously programmed accordingly, the controller 72 sends a text or a robot-call to a programmed phone number, indicating that pipe freezing threshold was detected and the system has been triggered.

Fail Safe Operation

If the flood mitigation system has been triggered, but the occupant desires to keep the flow of water into the house/building, the occupant can override the system utilizing the manual override valve 33 (see FIG. 1).

If the freeze prevention system has been triggered, but the occupant desires to keep water in the pipes, occupant can override the system utilizing manual override switch 66 of FIG. 3.

If either the flood mitigation or the pipe freeze prevention manual override valves (reference numerals 33 and 66) have been activated, the controller 50/72 warns of this condition, such as by illuminating a warning LED or displaying a warning on the display screen.

In the case of a power outage the flood mitigation valve 22 automatically closes (shutting the flow of water into structure) and the pipe freeze prevention valve 64 automatically opens (evacuating water from the structure's pipes). A user-controlled override can prevent either of these warnings and the attendant valve conditions.

According to another embodiment, the freeze prevention system comprises an additional safety device that pressurizes the flow path through the pipes to aid in releasing all the water from the pipes to an external point, such as a sewer system. Like operation of the freeze prevention system described above, the pipe pressurization system would be activated when one or more temperature sensors detects an interior temperature below a threshold value, such as 37 degrees F. As a fail-safe condition, the pipe pressurization system can also be activated when electric power to the structure has been interrupted for an extended period. Applying the concept of an extended outage avoids activating the freeze prevention system during short-duration power flickers.

The pipe pressurization component of the system comprises a pressurized air canister 130 depicted in FIG. 4 in the structure. In a larger structure (such as a commercial building) an air pump may be required to pump or force pressurized air into the piping system. Preferably, the system uses air, but not nitrogen or oxygen, since expanding nitrogen can cause freezing and pure oxygen presents an explosion danger.

To ensure that all or nearly all water has been removed from the piping system, the cannister or air pump 130 is ideally installed at a highest point in the piping system or at a point farthest from the drainage port where water exists in the structure. A case-by-case study of the structure will reveal the best location for the pressurized cannister or air pump.

The pipe pressurization system can be manually overridden by the owner or user of the structure (for example, by simply deactivating the pressurized air cannister or pressurized air pump) but at the risk of causing structural damage in the event of a pipe freeze. The system can include a seal or display an icon indicating that the override system is intact and ready for operation. If the seal is broken the user or owner takes full responsibility for any damage caused by frozen pipes. In one embodiment the override function can be initiated through controller software and a record is maintained of that override condition in non-volatile memory of the controller.

The pressurization system may also comprise a pressure flow detector or flow rate detector 133 (see FIG. 4) embedded on or within one or more pipes in the structure. Detection of a loss of pressure, possibly indicating a ruptured pipe, shuts the pressurization system down.

In commercial installations, or any installation with an emergency fire irrigation piping system, the two systems must be bifurcated so that the emergency fire irrigation systems remains operational upon occurrence of a pipe leak that can lead to a flooding condition.

In another embodiment of the system, the controller monitors and records sensor readings (water flow or pressure, for example), and analyzes daily/weekly/average sensed values, If any sensor reading (daily/weekly/average) reaches a predetermined first threshold, an alarm is activated. If the deviation reaches a second threshold, the system (freeze prevention or flood prevention) is immediately shut down to be reset only by an authorized individual. For example, in a commercial installation the system determines that water flow at nearly all sensors drops considerably during weekends when the commercial building is unoccupied. If during a certain weekend the water flow increases beyond a first threshold, as indicated by one or more sensors, an alarm is activated and if the water flow extends beyond a second threshold a predetermined automatic remedy (shutdown or evacuation) is activated.

Although the present invention has been described in the context of a house, the teachings of the invention can be applied to any commercial or industrial buildings, for example, factories, offices, hospitals, schools, storage, etc.

Certain system parameters (e.g., the temperature at which the freeze prevention system is activated) will vary depending on the specific installation and conditions associated with that installation. For example, the use of a wireless signal amplifier or repeater may not be required in all installations. As used herein, an open valve refers to a valve in a substantially open configuration and a closed valve refers to a valve in a substantially closed configuration.

Certain embodiments and installations may further comprise pressure sensors. One or both of the flood mitigation system 10 and/or the pipe freeze mitigation system 58 may be activated based on a predetermined pressure value.

In another embodiment, temperature sensors can be placed at multiple locations in the structure. If any one of the temperature sensors senses a temperature in excess of a predetermined value, the pipe freeze mitigation system 58 is activated.

The system of the invention is scalable, i.e., more sensors, repeaters, etc. can be added to the system as necessary for the installation.

Although described in the context of stopping water delivery to the entire structure, in another embodiment if one or more sensors localizes a water leak (or a low temperature that may cause a pipe freeze situation) to an area of the structure, valves within the water delivery system of the structure can be opened/closed to stop water delivery to that area.

Although the system has been described as including a controller 50 for the flood mitigation system and a controller 72 for the pipe freeze mitigation system, those skilled in the art recognize that a single controller (processor based or micro-controller based) can perform the control functions for both the flood mitigation system and the pipe freeze mitigation system.

As used herein, the phrase opening a valve and the phrase closing a valve refer to partially or completely opening or closing the valve.

What is claimed is:

1. A system disposed in a structure for controlling water delivery in to and out from the structure, the system comprising:
   a plurality of sensors disposed within the structure; a transmitter associated with each one of the plurality of sensors each one transmitting a sensor signal to a controller, at least one of the sensor signals indicating a water leak from the water delivery system, and at least one of the sensor signals indicating a temperature below a predetermined value;
   a shutdown valve controlling the flow of water into the structure;
   a pipe freeze mitigation valve controlling the flow of water out from the structure;
   a source of pressurized gas supplying the pressurized gas to the water delivery system; and
   the controller receiving the plurality of sensor signals, in response to a sensor signal indicating a water leak condition within the structure, the controller controlling the shutdown valve to control water flow into the structure, in response to a sensor signal indicating a temperature below a predetermined value the controller controlling the pipe freeze mitigation valve to drain water from the structure and activating the source of pressurized gas for applying pressure to the water delivery system to drain water from the structure.

2. The system of claim 1 in response to a sensor signal indicating a water leak condition within the structure, the controller further controlling the pipe freeze mitigation valve to control water flow out from the structure and activating the source of pressurized gas for applying pressure to the water delivery system to drain water from the structure.

3. The system of claim 1 further comprising:
   a shutdown override valve oriented in parallel fluid flow with the shutdown valve and automatically, by action of the controller, or manually, controllable to an open state for overriding a closed state of the shutdown valve; and
   a pipe freeze mitigation override valve oriented in serial fluid flow with the pipe freeze mitigation valve and automatically, by action of the controller, or manually, controllable to a closed state for overriding an open state of the pipe freeze mitigation valve.

4. The system of claim 1 wherein responsive to a loss of power to the structure, the controller closing the shutdown valve to stop the flow of water into the structure and opening the pipe freeze mitigation valve to drain water from the structure.

5. The system of claim 1 wherein the pressurized gas comprises pressurized air.

6. The system of claim 1 wherein the temperature comprises ambient air temperature within the structure or water temperature within the water delivery system.

7. The system of claim 1 further comprising a plurality of valves at distributed areas within the structure for directing the flow of water to those distributed areas, wherein when one or more of the plurality of sensors determines a water leak condition or a pipe freeze condition within an area of the structure, the controller controlling one or more of the plurality of valves to control water flow into that area of the structure.

8. The system of claim 1 the controller sending a text message, sending an email, or initiating a robo-call to one or more programmed telephone numbers, responsive to detecting water accumulation and controlling the shutdown valve responsive thereto, or sending a text message, sending an email, or initiating a robo-call to one or more programmed phone numbers, responsive to detecting a predetermined temperature and controlling the pipe freeze mitigation valve and the source of pressurized gas responsive thereto.

9. The system of claim 1 the controller storing a plurality of sensor threshold values for controlling the shutdown valve or controlling the pipe freeze mitigation valve.

10. The system of claim 1 further comprising a human interface screen for displaying a system status and for use in programming the system.

11. The system of claim 1 further comprising a wireless repeater amplifying signals between and among each one of the plurality of sensors, the shutdown valve, the pipe freeze mitigation valve, and the controller.

12. The system of claim 1 the controller indicates when the shutdown override valve is in an open state and when the pipe freeze mitigation override valve is in a closed state.

13. The system of claim 1 further comprising a plurality of pressure sensors disposed on the water delivery system providing a water pressure value to the controller.

14. The system of claim 1 wherein the controller opens the pipe freeze mitigation valve responsive to a sensor signal indicating an ambient temperature below a threshold or responsive to a sensor signal indicating loss of power to the structure.

15. The system of claim 1 the source of pressurized gas comprising a pressurized air cannister or comprising an air pump.

16. The system of claim 1 the source of pressurized gas disposed at a high elevation location within the structure or disposed at a distance from a water drain of the structure, a state of the water drain controlled by the pipe freeze mitigation valve.

17. The system of claim 1 further comprising a pressure flow sensor disposed in the water delivery system for generating a pressure sensor signal indicating pressure within the water delivery system, the controller responsive to the pressure sensor signal controlling the pipe freeze mitigation valve to an open state and controlling the shutdown valve to a closed state when the pressure sensor signal indicates a pressure greater than a predetermined pressure threshold.

18. The system of claim 1 one of the plurality of sensors comprises a flow sensor, the controller for storing flow values as determined by the flow sensor over a time interval and for issuing an alert if current flow values differ by more than a predetermined amount from the stored flow values.

19. The system of claim 1 the shutdown valve comprising a first receiver, the pipe freeze mitigation valve comprising a second receiver, the first receiver and the second receiver for receiving a signal from the controller to control a state of the shutdown valve or to control a state of the pipe freeze mitigation valve.

20. A structure having a controllable water delivery system disposed within the structure, the structure comprising:
   a plurality of sensors disposed within the structure, a first set of sensors from the plurality of sensors for determining occurrence of a water leak from the water delivery system, and a second set of sensors from the plurality of sensors for determining an ambient temperature within a proximate area of each sensor;
   a transmitter associated with each one of the plurality of sensors each one for transmitting a sensor signal to a controller;

a shutdown valve controlling water flow into the structure;
a pipe freeze mitigation valve controlling water flow out from the structure;
a source of pressurized gas supplying the pressurized gas to the water delivery system; and
the controller for receiving the plurality of sensor signals, responsive to a sensor signal indicating a leak in the water delivery system the controller closing the shutdown valve to prevent water from entering the structure, responsive to a sensor signal indicating an ambient temperature below a threshold, the controller opening the pipe freeze mitigation valve to drain water out from the structure, and activating the source of pressurized gas for applying pressure to the water delivery system to accelerate the flow of water out from the structure.

* * * * *